United States Patent
Terakawa et al.

(10) Patent No.: US 10,995,851 B2
(45) Date of Patent: May 4, 2021

(54) GEAR CHANGE CONTROL DEVICE

(71) Applicant: TOYOTA JIDOSHA KABUSHIKI KAISHA, Toyota (JP)

(72) Inventors: Tomomitsu Terakawa, Kariya (JP); Akihiko Ichikawa, Toyota (JP); Kotaro Hoshihara, Toyota (JP); Tomoyasu Kurimoto, Aichi-gun (JP); Jun Yabuta, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/695,257

(22) Filed: Nov. 26, 2019

(65) Prior Publication Data

US 2020/0166125 A1 May 28, 2020

(30) Foreign Application Priority Data

Nov. 28, 2018 (JP) .............................. JP2018-222350

(51) Int. Cl.
*F16H 61/04* (2006.01)
*F16D 48/06* (2006.01)

(52) U.S. Cl.
CPC ............. *F16H 61/04* (2013.01); *F16D 48/06* (2013.01); *F16D 2500/10406* (2013.01); *F16D 2500/3065* (2013.01); *F16D 2500/3067* (2013.01); *F16D 2500/30806* (2013.01); *F16D 2500/30816* (2013.01); *F16D 2500/50653* (2013.01); *F16D 2500/70422* (2013.01)

(58) Field of Classification Search
CPC ...................... F16H 61/04; F16D 48/06; F16D 2500/10406; F16D 2500/3065; F16D 2500/3067; F16D 2500/30806; F16D 2500/30816; F16D 2500/50653; F16D 2500/70422

See application file for complete search history.

(56) References Cited

U.S. PATENT DOCUMENTS

| 8,540,603 | B2 * | 9/2013 | Kobayashi | ............ B60W 10/06 477/5 |
| 9,043,103 | B2 | 5/2015 | Mori et al. | |
| 9,321,448 | B2 * | 4/2016 | Mori | ...................... F16H 63/502 |
| 2003/0000789 | A1 * | 1/2003 | Inoue | .................... F16D 48/066 192/3.26 |

(Continued)

FOREIGN PATENT DOCUMENTS

| JP | 2012-112396 A | 6/2012 |
| JP | 2018-48673 A | 3/2018 |
| WO | WO 2017/045711 A1 | 3/2017 |

*Primary Examiner* — Tisha D Lewis
(74) *Attorney, Agent, or Firm* — Oblon, McClelland, Maier & Neustadt, L.L.P.

(57) ABSTRACT

A gear change control device according to an embodiment includes a detection unit configured to detect the gear stage of a transmission and measure the input rotation rate of the transmission and the rotation rate of an engine and a controller configured to decrease the torque of a clutch to a second reference value from a first reference value when a first time elapses from a time point at which the rotation rate of the engine and the input rotation rate of the transmission become different from each other due to a gear change from a certain gear stage to a gear stage one or a plurality of stages higher than the certain gear stage that is performed by the transmission.

6 Claims, 7 Drawing Sheets

(56) References Cited

U.S. PATENT DOCUMENTS

| | | | |
|---|---|---|---|
| 2013/0096789 A1* | 4/2013 | McDonnell | B60W 10/06 |
| | | | 701/54 |
| 2013/0228027 A1 | 9/2013 | Ikeya et al. | |
| 2013/0317683 A1* | 11/2013 | Terakawa | B60W 10/08 |
| | | | 701/22 |
| 2015/0094923 A1* | 4/2015 | Ommer | F16D 48/06 |
| | | | 701/68 |
| 2016/0288795 A1 | 10/2016 | Ono et al. | |

* cited by examiner

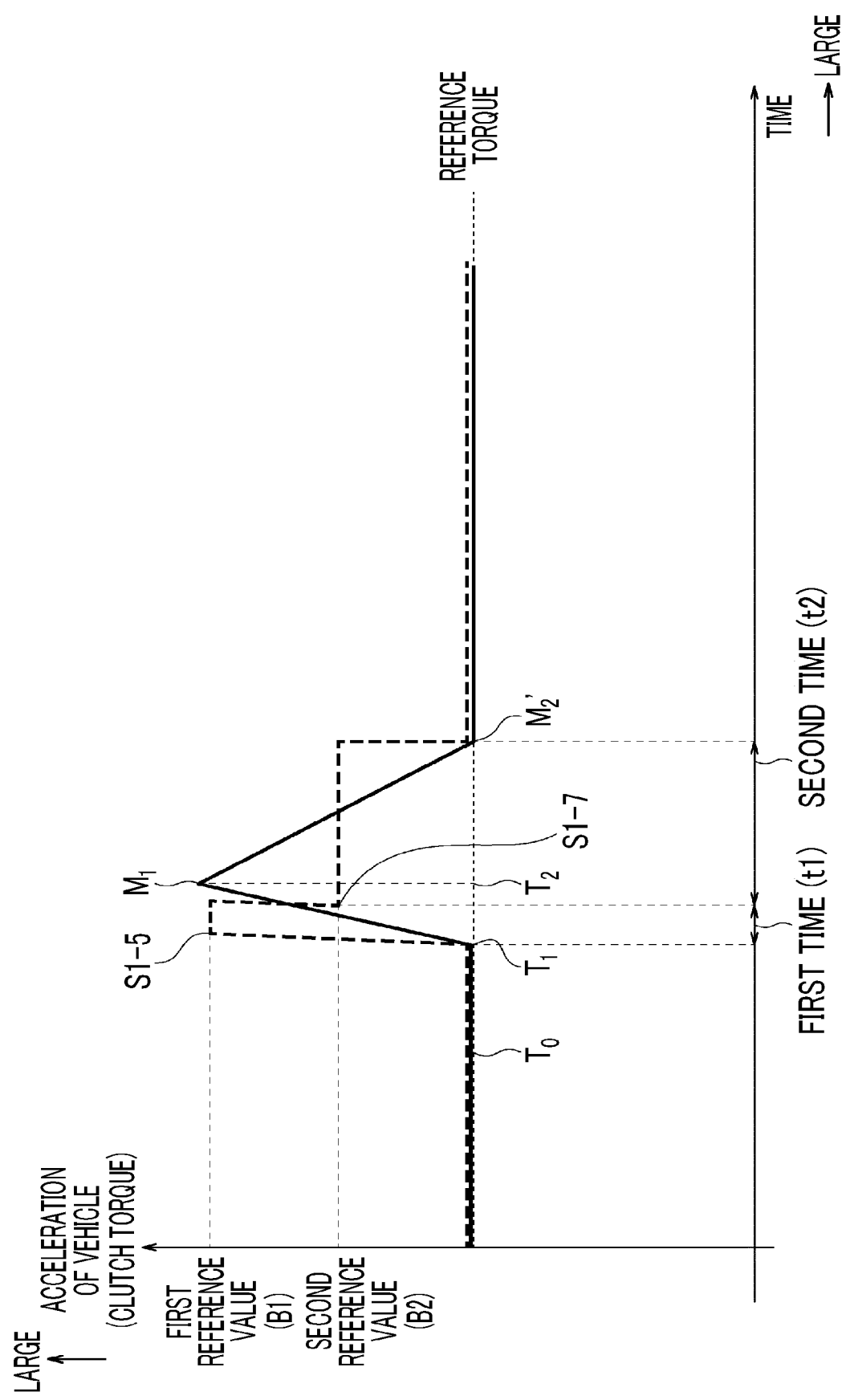

GEAR CHANGE CONTROL DEVICE

INCORPORATION BY REFERENCE

The disclosure of Japanese Patent Application No. 2018-222350 filed on Nov. 28, 2018 including the specification, drawings and abstract is incorporated herein by reference in its entirety.

BACKGROUND

1. Technical Field

A technique disclosed in the present application relates to a gear change control device that controls a transmission.

2. Description of Related Art

A gear change control device as disclosed in Japanese Unexamined Patent Application Publication No. 2012-112396 (JP 2012-112396 A) has been known as a gear change control device that controls a transmission. In the case of the seamless type transmission disclosed in JP 2012-112396 A, a gear change is performed after a start clutch is substantially equalized to an engine in torque such that occurrence of a shock is suppressed.

SUMMARY

However, in the case of the transmission disclosed in JP 2012-112396 A, the rotation rate of an input shaft is decreased in an instant at the time of a gear change and thus there is a considerable impact on drive power. Such an impact causes drive power fluctuation, which results in a decrease in quality of the transmission.

Therefore, the disclosure provides a gear change control device that improves the quality of a transmission.

An aspect of the disclosure relates to a gear change control device including a detection unit and a controller. The detection unit is configured to detect the gear stage of a transmission and measure the input rotation rate of the transmission and the rotation rate of an engine. The controller is configured to decrease the torque of a clutch to a second reference value from a first reference value when a first time elapses from a time point at which the rotation rate of the engine and the input rotation rate of the transmission become different from each other due to a gear change from a certain gear stage to a gear stage one or a plurality of stages higher than the certain gear stage that is performed by the transmission.

According to the aspect of the disclosure, it is possible to provide a gear change control device that improves the quality of a transmission.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram schematically illustrating an example of how the behavior of the acceleration of the vehicle is in a case where the allowable transmission torque of the clutch is controlled according to a third example in the transmission shown in FIG. 1.

DETAILED DESCRIPTION OF EMBODIMENTS

Figure 1:
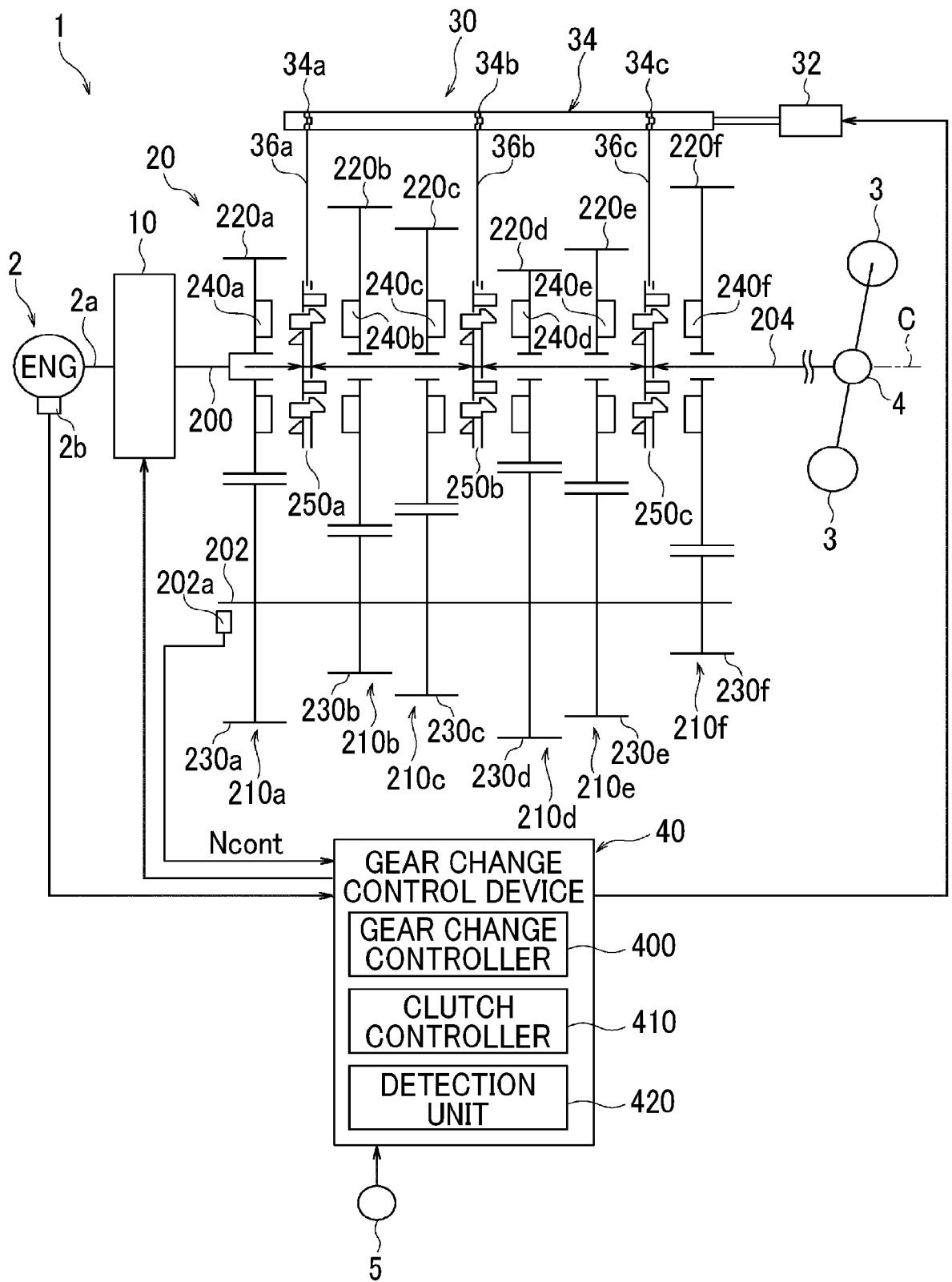
FIG. 1 is a schematic diagram simply illustrating an example of the configuration of a transmission in which a gear change control device according to an embodiment is installed.

Hereinafter, various embodiments of the disclosure will be described with reference to the attached drawings. The same constituent elements in the drawings are given the same reference numerals. In addition, please note that a constituent element in a certain drawing may be omitted in another drawing for the sake of convenience in description. Furthermore, please note that the attached drawings are not necessarily drawn on an accurate scale.

1. Configuration of Transmission

FIG. 1 is a schematic diagram simply illustrating an example of the configuration of a transmission in which a gear change control device according to an embodiment is installed. A transmission 1 shown in FIG. 1 is a parallel two-shaft transmission that is provided in a power transmission path between an engine 2 and drive wheels 3 and can perform a gear change to a plurality of gear stages by decreasing or increasing the speed of rotation input from the engine 2 at a predetermined gear ratio γ.

As shown in FIG. 1, the transmission 1 can include a clutch 10, a gear change mechanism 20, a shift mechanism 30, and a gear change control device 40 as main components.

1-1. Clutch 10

The clutch 10 is provided in a power transmission path between the engine 2 and the gear change mechanism 20. The clutch 10 is configured such that transmission torque can be controlled via an electromagnetic solenoid (not shown). The transmission torque of the clutch 10 can be adjusted within a range from zero to the maximum value with the gear change control device 40 controlling an electric current command value of the electromagnetic solenoid. By being controlled by the gear change control device 40 in this manner, the clutch 10 can transition between a non-torque transmission state (clutch-disengaged state) and a fully engaged state.

1-2. Gear Change Mechanism 20

The gear change mechanism 20 can include an input shaft 200 that is coupled to the engine 2 via the clutch 10 such that power can be transmitted, a counter shaft 202 that is disposed to be parallel to the input shaft 200, and an output shaft 204 that is coupled to the drive wheels 3 via a differential mechanism 4 or the like such that power can be transmitted, as rotary shafts. The input shaft 200 and the output shaft 204 are disposed on the same axis C as a crankshaft 2a of the engine 2.

The gear change mechanism 20 can include a first gear pair 210a, a second gear pair 210b, a third gear pair 210c, a fourth gear pair 210d, a fifth gear pair 210e, and a sixth gear pair 210f arranged along the axis C in a direction from the engine 2 to the drive wheels 3 (hereinafter, gear pairs will be simply referred to as "gear pairs 210" in case where first to sixth gear pairs 210a to 210f are not distinguished from each other).

The first gear pair 210a includes an input gear 220a and a counter gear 230a meshing with the input gear 220a. The input gear 220a is connected to the input shaft 200 and is fitted onto the output shaft 204 such that the input gear 220a can rotate relatively. Rotation of the engine 2 is transmitted to the input gear 220a via the clutch 10. The counter gear 230a is provided such that the counter gear 230a cannot rotate relative to the counter shaft 202. Therefore, when the input gear 220a rotates, the rotation is transmitted to the counter gear 230a and thus the counter shaft 202 is rotated. In addition, meshing teeth 240a functioning as one part of meshing teeth constituting a first dog clutch 250a (which will be described later) are formed on the input gear 220a.

The second gear pair 210b includes a second gear 220b and a second counter gear 230b meshing with the second gear 220b. The second gear 220b is fitted onto an outer circumferential surface of the output shaft 204 such that the second gear 220b can rotate relatively. The second counter gear 230b is provided such that the second counter gear 230b cannot rotate relative to the counter shaft 202. The second gear 220b and the output shaft 204 are provided such that the second gear 220b and the output shaft 204 can be connected and disconnected to and from each other via the first dog clutch 250a (which will be described later). When the second gear 220b and the output shaft 204 are connected to each other via the first dog clutch 250a such that the second gear 220b and the output shaft 204 cannot rotate relative to each other, the counter shaft 202 and the output shaft 204 are connected to each other such that power can be transmitted via the second gear pair 210b. In this state, a second gear stage 2nd is established in the gear change mechanism 20. In addition, meshing teeth 240b functioning as one part of the meshing teeth constituting the first dog clutch 250a are formed on the second gear 220b.

The third gear pair 210c includes a third gear 220c and a third counter gear 230c meshing with the third gear 220c. The third gear 220c is fitted onto the outer circumferential surface of the output shaft 204 such that the third gear 220c can rotate relatively. The third counter gear 230c is provided such that the third counter gear 230c cannot rotate relative to the counter shaft 202. The third gear 220c and the output shaft 204 are provided such that the third gear 220c and the output shaft 204 can be connected and disconnected to and from each other via a second dog clutch 250b (which will be described later). When the third gear 220c and the output shaft 204 are connected to each other via the second dog clutch 250b such that the third gear 220c and the output shaft 204 cannot rotate relative to each other, the counter shaft 202 and the output shaft 204 are connected to each other such that power can be transmitted via the third gear pair 210c. In this state, a third gear stage 3rd is established in the gear change mechanism 20. In addition, meshing teeth 240c functioning as one part of the meshing teeth constituting the second dog clutch 250b are formed on the third gear 220c.

The fourth gear pair 210d includes a sixth gear 220d and a sixth counter gear 230d meshing with the sixth gear 220d. The sixth gear 220d is fitted onto the outer circumferential surface of the output shaft 204 such that the sixth gear 220d can rotate relatively. The sixth counter gear 230d is provided such that the sixth counter gear 230d cannot rotate relative to the counter shaft 202. The sixth gear 220d and the output shaft 204 are provided such that the sixth gear 220d and the output shaft 204 can be connected and disconnected to and from each other via the second dog clutch 250b. When the sixth gear 220d and the output shaft 204 are connected to each other via the second dog clutch 250b such that the sixth gear 220d and the output shaft 204 cannot rotate relative to each other, the counter shaft 202 and the output shaft 204 are connected to each other such that power can be transmitted via the fourth gear pair 210d. In this state, a sixth gear stage 6th is established in the gear change mechanism 20. In addition, meshing teeth 240d functioning as one part of the meshing teeth constituting the second dog clutch 250b are formed on the sixth gear 220d.

The fifth gear pair 210e includes a fourth gear 220e and a fourth counter gear 230e meshing with the fourth gear 220e. The fourth gear 220e is fitted onto the outer circumferential surface of the output shaft 204 such that the fourth gear 220e can rotate relatively. The fourth counter gear 230e is provided such that the fourth counter gear 230e cannot rotate relative to the counter shaft 202. The fourth gear 220e and the output shaft 204 are provided such that the fourth gear 220e and the output shaft 204 can be connected and disconnected to and from each other via a third dog clutch 250c (which will be described later). When the fourth gear 220e and the output shaft 204 are connected to each other via the third dog clutch 250c such that the fourth gear 220e and the output shaft 204 cannot rotate relative to each other, the counter shaft 202 and the output shaft 204 are connected to each other such that power can be transmitted via the fifth gear pair 210e. In this state, a fourth gear stage 4th is established in the gear change mechanism 20. In addition, meshing teeth 240e functioning as one part of meshing teeth constituting the third dog clutch 250c are formed on the fourth gear 220e.

The sixth gear pair 210f is configured to include a first gear 220f and a first counter gear 230f meshing with the first gear 220f. The first gear 220f is fitted onto the outer circumferential surface of the output shaft 204 such that the first gear 220f can rotate relatively. The first counter gear 230f is provided such that the first counter gear 230f cannot rotate relative to the counter shaft 202. The first gear 220f and the output shaft 204 are provided such that the first gear 220f and the output shaft 204 can be connected and disconnected to and from each other via the third dog clutch 250c. When the first gear 220f and the output shaft 204 are connected to each other via the third dog clutch 250c such that the first gear 220f and the output shaft 204 cannot rotate relative to each other, the counter shaft 202 and the output shaft 204 are connected to each other such that power can be transmitted via the sixth gear pair 210f. At this time, a first gear stage 1st is established in the gear change mechanism 20. In addition, meshing teeth 240f functioning as one part of the meshing teeth constituting the third dog clutch 250c are formed on the first gear 220f.

In addition, in the output shaft 204, the gear change mechanism 20 includes the first dog clutch 250a between the input gear 220a and the second gear 220b, the second dog clutch 250b between the third gear 220c and the sixth gear 220d, and the third dog clutch 250c between the fourth gear 220e and the first gear 220f (hereinafter, first to third dog clutches 250a to 250c will be simply referred to as "dog clutches 250" in case where first to third dog clutches 250a to 250c are not distinguished from each other).

Each dog clutch 250 is configured to include a pair of meshing teeth, is connected when the meshing teeth mesh (engage) with each other, and is disconnected when the meshing teeth are unmeshed (disengaged) from each other.

The first dog clutch 250a is disposed along the axis C at a position adjacent to the input gear 220a and the second gear 220b and is a clutch (connection and disconnection mechanism) that connects and disconnects a power transmission path between the output shaft 204 and the input gear 220a and connects and disconnects a power transmission path between the output shaft 204 and the second gear 220b. Specifically, the first dog clutch 250a is configured to be able to switch between a state where the input gear 220a or the second gear 220b and the output shaft 204 are connected to each other such that the input gear 220a or the second gear 220b and the output shaft 204 cannot rotate relative to each other and a state where the input gear 220a, the second gear 220b, and the output shaft 204 are disconnected from each other. When there is a switch to a state where the input gear 220a and the output shaft 204 are connected to each other via the first dog clutch 250a, the input shaft 200 and the output shaft 204 are directly connected to each other and thus a fifth gear stage 5th, in which the gear ratio γ is 1.0, is established. In addition, when there is a switch to a state where the second gear 220b and the output shaft 204 are connected to each other via the first dog clutch 250a, the second gear stage 2nd is established. As described above, the first dog clutch 250a is provided to establish each of the fifth gear stage 5th and the second gear stage 2nd.

The second dog clutch 250b is disposed along the axis C at a position adjacent to the third gear 220c and the sixth gear 220d and is a clutch (connection and disconnection mechanism) that connects and disconnects a power transmission path between the output shaft 204 and the third gear 220c and connects and disconnects a power transmission path between the output shaft 204 and the sixth gear 220d. Specifically, the second dog clutch 250b is configured to be able to switch between a state where the third gear 220c or the sixth gear 220d and the output shaft 204 are connected to each other such that the third gear 220c or the sixth gear 220d and the output shaft 204 cannot rotate relative to each other and a state where the third gear 220c, the sixth gear 220d, and the output shaft 204 are disconnected from each other. When there is a switch to a state where the third gear 220c and the output shaft 204 are connected to each other via the second dog clutch 250b, the third gear stage 3rd is established and when there is a switch to a state where the sixth gear 220d and the output shaft 204 are connected to each other via the second dog clutch 250b, the sixth gear stage 6th is established. As described above, the second dog clutch 250b is provided to establish each of the third gear stage 3rd and the sixth gear stage 6th.

The third dog clutch 250c is disposed along the axis C at a position adjacent to the fourth gear 220e and the first gear 220f and is a clutch (connection and disconnection mechanism) that connects and disconnects a power transmission path between the output shaft 204 and the fourth gear 220e and connects and disconnects a power transmission path between the output shaft 204 and the first gear 220f. Specifically, the third dog clutch 250c is configured to be able to switch between a state where the fourth gear 220e or the first gear 220f and the output shaft 204 are connected to each other such that the fourth gear 220e or the first gear 220f and the output shaft 204 cannot rotate relative to each other and a state where the fourth gear 220e, the first gear 220f, and the output shaft 204 are disconnected from each other. When there is a switch to a state where the fourth gear 220e and the output shaft 204 are connected to each other via the third dog clutch 250c, the fourth gear stage 4th is established and when there is a switch to a state where the first gear 220f and the output shaft 204 are connected to each other via the third dog clutch 250c, the first gear stage 1st is established. As described above, the third dog clutch 250c is provided to establish each of the first gear stage 1st and the fourth gear stage 4th. As described above, the gear change mechanism 20 is configured to be able to perform a gear change to each of six forward gears as the first to third dog clutches 250a to 250c for establishing each gear stage switch between connection and disconnection states.

The dog clutches 250 configured as described are operated by the shift mechanism 30.

1-3. Shift Mechanism 30

The shift mechanism 30 can include, for example, an electrified actuator 32, a shift shaft 34 that is rotated by the actuator 32, and first to third shift forks 36a to 36c that are configured to be able to move in a direction parallel to the axis C in accordance with rotation of the shift shaft 34.

A first end of the first shift fork 36a is fitted into a shift groove 34a formed in the shift shaft 34 and a second end of the first shift fork 36a is fitted into a recessed groove formed in an outer periphery portion of the first dog clutch 250a. Accordingly, when the shift shaft 34 rotates, the first shift fork 36a is moved in the direction parallel to the axis C in accordance with the shape of the shift groove 34a and the first dog clutch 250a fitted onto the first shift fork 36a is also moved in the direction parallel to the axis C.

A first end of the second shift fork 36b is fitted into a shift groove 34b formed in the shift shaft 34 and a second end of the second shift fork 36b is fitted into a recessed groove formed in an outer periphery portion of the second dog clutch 250b. Accordingly, when the shift shaft 34 rotates, the second shift fork 36b is moved in the direction parallel to the axis C in accordance with the shape of the shift groove 34b and the second dog clutch 250b fitted onto the second shift fork 36b is also moved in the direction parallel to the axis C.

A first end of the third shift fork 36c is fitted into a shift groove 34c formed in the shift shaft 34 and a second end of the third shift fork 36c is fitted into a recessed groove formed in an outer periphery portion of the third dog clutch 250c. Accordingly, when the shift shaft 34 rotates, the third shift fork 36c is moved in the direction parallel to the axis C in accordance with the shape of the shift groove 34c and the third dog clutch 250c fitted onto the third shift fork 36c is also moved in the direction parallel to the axis C.

The shift grooves 34a to 34c are formed to have different shapes. Specifically, the shapes of the shift grooves 34a to 34c are set such that the position of each dog clutch 250 in the direction parallel to the axis C is changed, the connection and disconnection state of each dog clutch 250 is switched, and upshifting is performed in order from the first gear stage 1st to the sixth gear stage 6th when the shift shaft 34 rotates in one rotation direction. In other words, the shapes of the shift grooves 34a to 34c are set such that the position of each dog clutch 250 in the direction parallel to the axis C is changed, the connection and disconnection state of each dog clutch 250 is switched, and downshifting is performed in order from the sixth gear stage 6th to the first gear stage 1st when the shift shaft 34 rotates in the other direction. Note that, at a transitional period in a gear change, the re-clamping of each dog clutch 250 is performed such that the dog clutch 250 that establishes a gear change target gear stage is connected and the dog clutch 250 that establishes a gear stage before the gear change is disconnected.

In addition, a rotation position of the shift shaft 34 is set for each gear stage, in advance. When a determination is made that a gear change to a predetermined gear stage is to be performed, the actuator 32 controlled by the gear change control device 40 causes the shift shaft 34 to rotate to a rotation position corresponding to the predetermined gear stage such that the connection and disconnection state of each dog clutch 250 is switched. In this manner, the transmission 1 is subject to the gear change to the predetermined gear stage.

1-4. Gear Change Control Device 40

The gear change control device 40 controls the operation (gear change or like) of the transmission 1. The gear change control device 40 may be mounted by means of a microcomputer (not shown) that is mainly provided with a storage device including a central processing unit (CPU), a read only memory (ROM), and a random access memory (RAM) and an input and output interface. The CPU can control the operation of the transmission 1 by executing a program (plurality of orders included in program) stored in the ROM while using a temporal storage function of the RAM.

A signal indicating a rotation speed Ne of the engine 2 which is measured by a sensor 2b provided in relation to the engine 2, a signal indicating a rotation speed Ncont of the counter shaft 202 which is measured by a sensor 202a provided in relation to the counter shaft 202, a signal indicating an accelerator operation amount Acc which is a stepping-on amount (operation amount) of an acceleration pedal and is measured by a sensor (accelerator operation amount sensor) 5 provided in relation to an accelerator (not shown), and the like may be supplied to the gear change control device 40, for example.

The gear change control device 40 controls the transmission torque (torque capacity) of the clutch 10 by transmitting a drive signal to the clutch 10 (electromagnetic solenoid thereof). In addition, the gear change control device 40 can transmit a drive signal to the actuator 32 to control the actuator 32 such that the connection and disconnection state of each dog clutch 250 is switched.

In terms of functions, the gear change control device 40 configured as described above can include a gear change controller 400 that controls the operation of the gear change mechanism 20 and the shift mechanism 30 by controlling a drive signal transmitted to the actuator 32, a clutch controller 410 that controls the clutch 10 by controlling a drive signal transmitted to the electromagnetic solenoid installed in the clutch 10, and a detection unit 420 that detects the current gear stage of the gear change mechanism 20 (for example, which of first to sixth gear stages or like gear change mechanism 20 is in) and measures the rotation speed (number of times of rotation per unit time) of the input shaft 200 of the gear change mechanism 20, the rotation speed (number of times of rotation per unit time) of the engine 2, or the like.

The gear change controller 400 controls the actuator 32 to perform the re-clamping of the dog clutches 250 in which the dog clutch 250 that establishes a gear change target gear stage (gear stage after gear change) is connected (engaged) and the dog clutch 250 that establishes a gear stage before the gear change is disconnected (disengaged). When the dog clutch 250 that establishes the gear change target gear stage is connected, the power transmission path is switched from a path via the gear pair 210 corresponding to the gear stage before the gear change to a path via the gear pair 210 corresponding to the gear change target gear stage such that drive power is transmitted via the gear pair 210 corresponding to the gear change target gear stage. At this time, the dog clutch 250 that establishes the gear stage before the gear change is disconnected.

The clutch controller 410 increases and decreases the transmission torque (torque capacity) of the clutch 10 by controlling a drive signal transmitted to the electromagnetic solenoid installed in the clutch 10 in relation to an operation of controlling a gear change from a certain gear stage to another gear stage which is performed by the gear change controller 400. The specific operation of the clutch controller 410 will be described later.

The detection unit 420 can detect the current gear stage (for example, first to sixth gear stages or like) of the gear change mechanism 20 by receiving a signal for identification of the current gear stage from the gear change controller 400 since the gear change controller 400 that controls a gear change in the gear change mechanism 20 recognizes the current gear stage, for example. In addition, the detection unit 420 can measure the rotation speed (number of times of rotation per unit time) of the engine 2 by receiving a signal indicating the rotation speed Ne of the engine 2 which is measured by the sensor 2b provided in relation to the engine 2, for example. Furthermore, the detection unit 420 can calculate the rotation speed (number of times of rotation per unit time) of the input shaft 200 from the rotation speed Ncont measured by the sensor 202a and a gear ratio between the input gear 220a and the counter gear 230a. Note that, in a case where a sensor (not shown) that measures a rotation rate is provided in relation to the input shaft 200, the detection unit 420 can measure the rotation speed of the input shaft 200 by using a rotation speed measured by the sensor.

Since the detection unit 420 detects and measures such factors, one or both of the detection unit 420 and the clutch controller 410 can recognize that the rotation speed (number of times of rotation per unit time) of the engine 2 and the rotation rate (number of times of rotation per unit time) of the input shaft 200 are different from each other or the same as each other. Furthermore, since the detection unit 420 detects and measures such factors, the clutch controller 410 can control the transmission torque of the clutch 10 such that the value of the transmission torque becomes a value specified based on the gear stage of the transmission 1 (from which gear stage and to which gear stage gear change is performed) and the rotation rate (number of times of rotation per unit time) of the input shaft 200 of the transmission 1 immediately before a gear change (that is, immediately before decrease in rotation rate).

2. Operation of Transmission 2-1. Operation of Gear Change Mechanism 20

Before description on the operation of the entire transmission 1 in which the gear change control device 40 according to the present embodiment is installed, a basic operation performed by the gear change mechanism 20 at the time of a gear change from a certain gear stage to another gear stage will be described.

Hereinafter, description will be made by using upshifting from the first gear stage to the second gear stage as an example. The basic operation is the same for other gear changes (upshifting other than upshifting from first gear stage 1st to second gear stage 2nd and downshifting) and thus detailed description thereof will be omitted.

FIGS. 2A to 2F are schematic diagrams that illustrate the states of the first dog clutch 250a and the third dog clutch 250c at a transitional period in a gear change from the first gear stage to the second gear stage in the transmission shown in FIG. 1, in a chronological order. In such a transitional period in a gear change, the states of the first dog clutch 250a and the third dog clutch 250c change in an order as shown in FIG. 2A to FIG. 2F.

Figure 2A:
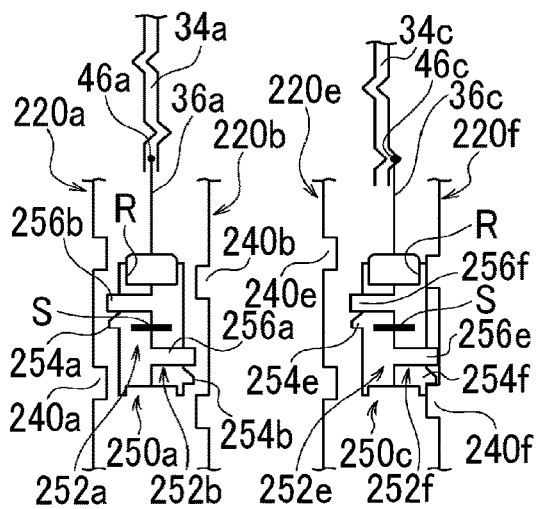
FIGS. 2A to 2F are schematic diagrams that illustrate the states of dog clutches at a transitional period in a gear change from a first gear stage to a second gear stage in the transmission shown in FIG. 1, in a chronological order.

FIG. 2A schematically illustrates the first dog clutch 250a and the third dog clutch 250c at the time of travelling in the first gear stage 1st and schematically illustrates a part of each of the first dog clutch 250a and the third dog clutch 250c in a circumferential direction in a planar manner. In addition, on the opposite sides of the first dog clutch 250a, the meshing teeth 240a of the input gear 220a and the meshing teeth 240b of the second gear 220b that can mesh (engage) with the first dog clutch 250a are illustrated in a planar manner and on the opposite sides of the third dog clutch 250c, the meshing teeth 240e of the fourth gear 220e and the meshing teeth 240f of the first gear 220f that can mesh (engage) with the third dog clutch 250c are illustrated in a planar manner. Note that, the second dog clutch 250b is not shown since the second dog clutch 250b does not contribute to the upshifting from the first gear stage 1st to the second gear stage 2nd.

As for the first dog clutch 250a in FIGS. 2A to 2F, the left side of the first dog clutch 250a in the drawings corresponds to a first dog ring 252a and the right side of the first dog clutch 250a in the drawings corresponds to a second dog ring 252b. The first dog ring 252a and the second dog ring 252b are urged by a spring S constituting a coupling mechanism in a direction in which the first dog ring 252a and the second dog ring 252b abut onto each other. The first dog ring 252a is formed with a first meshing tooth 254a that protrudes toward the input gear 220a side and a second meshing tooth 256a that penetrates the second dog ring 252b and protrudes toward the second gear 220b side. In addition, the second dog ring 252b is formed with a third meshing tooth 254b that protrudes toward the second gear 220b side and a fourth meshing tooth 256b that penetrates the first dog ring 252a and protrudes toward the input gear 220a side.

The first shift fork 36a is fitted into a recessed groove R formed by the first dog ring 252a and the second dog ring 252b. In addition, the first shift fork 36a is formed with an engagement portion 46a which is illustrated with a black dot and the engagement portion 46a engages with the shift groove 34a formed on the shift shaft 34. Therefore, when the shape of the shift groove 34a engaging with the engagement portion 46a changes due to rotation of the shift shaft 34, the first shift fork 36a moves in the direction parallel to the axis C along the shift groove 34a together with the engagement portion 46a.

Since the third dog clutch 250c shown in FIGS. 2A to 2F is basically the same as the first dog clutch 250a as described above, description thereof will be omitted. Note that, a first dog ring constituting the third dog clutch 250c is given a reference numeral "252e", a second dog ring is given a reference numeral "252f", a first meshing tooth and a second meshing tooth formed on the first dog ring 252e are given reference numerals "254e" and "256e" respectively, and a third meshing tooth and a fourth meshing tooth formed on the second dog ring 252f are given reference numerals "254f" and "256f" respectively.

In FIGS. 2A to 2F, an upward direction in the drawings is a rotation direction at the time of forward travelling. That is, at the time of forward travelling, the input gear 220a, the second gear 220b, the fourth gear 220e, and the first gear 220f move upward in FIGS. 2A to 2F. Note that, the input gear 220a, the second gear 220b, the fourth gear 220e, and the first gear 220f are rotated at a rotation speed based on the rotation speed of the engine 2 and the gear ratio γ mechanically set for each gear stage. Specifically, in a case where the rotation speed of the engine 2 is the same, the rotation speed of the first gear 220f corresponding to the first gear stage 1st is lowest and the higher a gear stage that a gear-change gear corresponds to is, the higher the rotation speed of the gear is. In addition, the first dog clutch 250a and the third dog clutch 250c integrally rotate with the output shaft 204. In addition, the first meshing tooth 254a and the third meshing tooth 254b are formed with inclined surfaces and the first meshing tooth 254e and the third meshing tooth 254f are also formed with inclined surfaces.

The states of the first dog clutch 250a and the third dog clutch 250c (engagement state, meshing state) at the time of travelling in the first gear stage 1st, which is shown in FIG. 2A, will be described. At the time of travelling in the first gear stage 1st, the first shift fork 36a fitted into the recessed groove R of the first dog clutch 250a is moved to a neutral position (N position) based on the shift groove 34a. At this time, each meshing tooth of the first dog clutch 250a does not mesh with any of the meshing teeth 240a of the input gear 220a and the meshing teeth 240b of the second gear 220b such that no power is transmitted between the input gear 220a, the second gear 220b, and the output shaft 204.

Meanwhile, the third dog clutch 250c is moved toward the first gear 220f side in the direction parallel to the axis C with the third shift fork 36c moved to a first gear stage position (1st position) based on the shape of the shift groove 34c. At this time, the third meshing tooth 254f and the meshing teeth 240f of the first gear 220f mesh with each other such that power is transmitted between the third dog clutch 250c and the first gear 220f. Therefore, the first gear 220f and the output shaft 204 are coupled to each other such that power can be transmitted via the third dog clutch 250c and thus the first gear stage 1st is established.

Figure 2B:
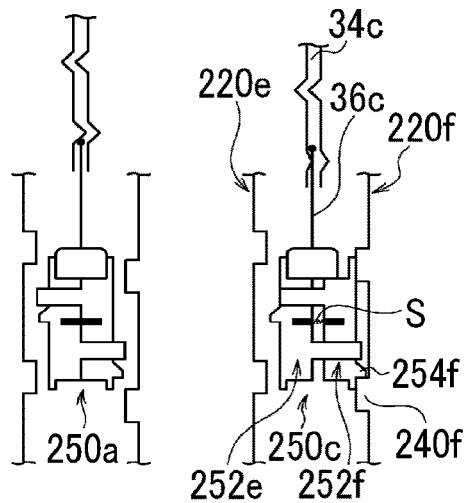

FIG. 2B illustrates a state where upshifting to the second gear stage 2nd is started. With the shift shaft 34 rotating, the third shift fork 36c is moved in a direction away from the first gear 220f (left direction in drawing) in the third dog clutch 250c in accordance with a change in shape of the shift groove 34c. Accordingly, the first dog ring 252e is moved in a direction away from the second dog ring 252f while being pressed by the third shift fork 36c and the spring S is elastically deformed such that an urging force F is generated between the first dog ring 252e and the second dog ring 252f. Meanwhile, since power is transmitted between the third meshing tooth 254f of the second dog ring 252f and the meshing teeth 240f of the first gear 220f, the third meshing tooth 254f and the meshing teeth 240f meshing with each other are maintained against the urging force F of the spring S due to friction between the third meshing tooth 254f and the meshing teeth 240f. Therefore, the first dog ring 252e and the second dog ring 252f of the third dog clutch 250c are separated in the direction parallel to the axis C.

Figure 2C:
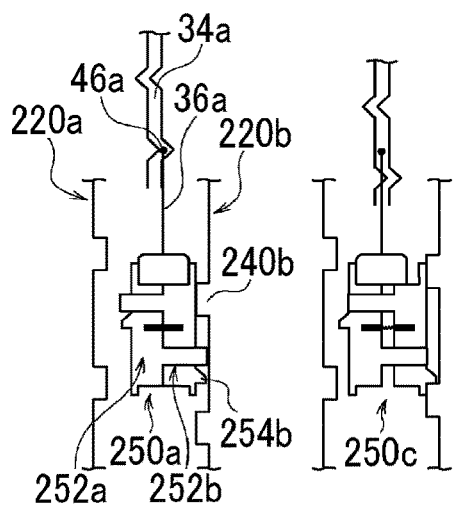

FIG. 2C illustrates a state where the first dog clutch 250a is moved toward the second gear 220b side in order to establish the second gear stage 2nd. With the shift shaft 34 rotating, the first shift fork 36a engaging with the shift groove 34a is moved toward the second gear 220b side and thus the first dog clutch 250a is moved toward the second gear 220b side while being pressed by the first shift fork 36a. As a result, the third meshing tooth 254b of the second dog ring 252b and the meshing teeth 240b of the second gear 220b become able to mesh with each other (third meshing tooth 254b and meshing teeth 240b are not yet meshing with each other in FIG. 2C).

Figure 2D:
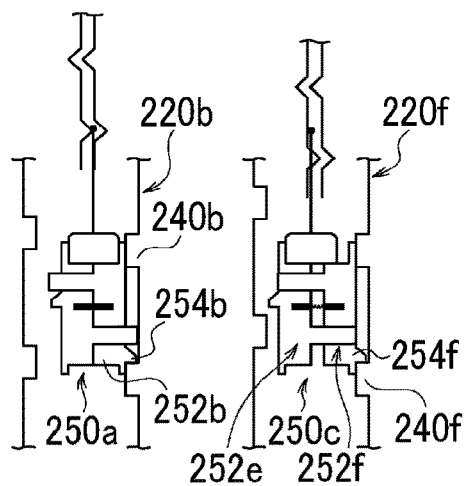

FIG. 2D illustrates a state where the third meshing tooth 254b of the second dog ring 252b of the first dog clutch 250a and the meshing teeth 240b of the second gear 220b mesh with each other. In FIG. 2D, since the rotation speed of the second gear 220b is higher than the rotation speed of the first dog clutch 250a, the third meshing tooth 254b and the meshing teeth 240b of the second gear 220b quickly mesh with each other when a state as shown in FIG. 2C is entered. As a result, a simultaneously meshing state in which the third meshing tooth 254b of the first dog clutch 250a and the meshing teeth 240b of the second gear 220b mesh with each other and the third meshing tooth 254f of the third dog clutch 250c and the meshing teeth 240f of the first gear 220f mesh with each other is entered.

Figure 2E:
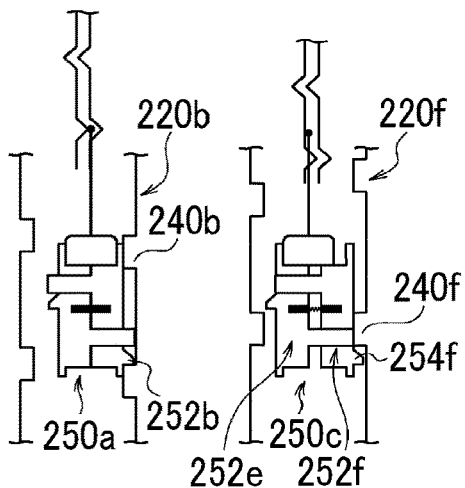

FIG. 2E illustrates where the third meshing tooth 254f of the first dog ring 252e of the third dog clutch 250c and the meshing teeth 240f of the first gear 220f are unmeshed (disengaged) from each other. When the meshing teeth 240b of the second gear 220b and the third meshing tooth 254b of the first dog clutch 250a mesh with each other in FIG. 2D, the output shaft 204 is rotated at a rotation speed based on the second gear stage 2nd and thus the rotation speed of the first dog ring 252e and the second dog ring 252f of the third dog clutch 250c becomes higher than the rotation speed of the first gear 220f. Therefore, the third meshing tooth 254f of the second dog ring 252f and the meshing teeth 240f of the first gear 220f are unmeshed (disengaged) from each other.

Figure 2F:
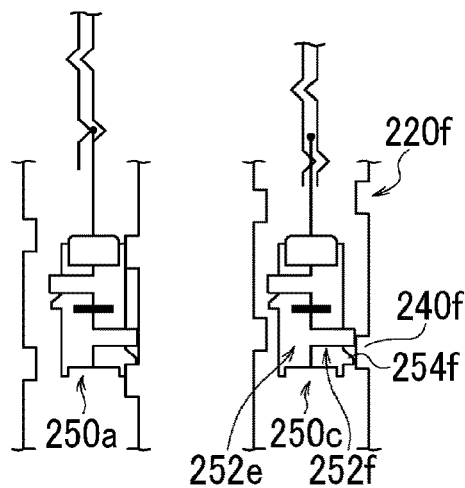

FIG. 2F illustrates a state where the second dog ring 252f of the third dog clutch 250c is pulled toward the first dog ring 252e side. When the third meshing tooth 254f and the meshing teeth 240f of the first gear 220f meshing (engaging) with each other are released from each other in FIG. 2E, a force generated by friction between the third meshing tooth 254f and the meshing teeth 240f disappears (becomes weaker than urging force F) and thus the second dog ring 252f is pulled toward the first dog ring 252e side due to the urging force F of the spring S. As a result, the third dog clutch 250c switches to a neutral state where the third dog clutch 250c does not mesh with any of the meshing teeth 240f and a gear change to the second gear stage 2nd is finished. As described above, when the third meshing tooth 254b of the first dog clutch 250a and the meshing teeth 240b of the second gear 220b mesh with each other, the third meshing tooth 254f of the third dog clutch 250c and the meshing teeth 240f of the first gear 220f are unmeshed (disengaged) from each other quickly and thus torque loss during a gear change is prevented. Note that, a switch from a state as shown in FIG. 2C to a state as shown in FIG. 2F is performed in a very short time. In addition, the third meshing tooth 254f is formed with the inclined surface. Therefore, even if the second dog ring 252f is pulled by the urging force F of the spring S late, the meshing teeth 240f come into contact with the inclined surface and the second dog ring 252f is pressed due to the inclined surface and thus is reliably unmeshed (disengaged).

As described above, at the time of a gear change in the transmission 1 (gear change mechanism 20), the dog clutch 250 (for example, first dog clutch 250a) before a gear change is quickly disengaged after a gear stage after the gear change (for example, second gear stage 2nd) is established in a state where the dog clutch 250 (for example, third dog clutch 250c) corresponding to a gear stage before the gear change (for example, first gear stage 1st) is engaged, so that the gear change is performed without discontinuation of torque transmission (seamless gear change). Meanwhile, when the meshing tooth of the dog clutch 250 and the meshing teeth of the gear pair 210 are caused to mesh with each other in a state where there is a difference in rotation speed between the dog clutch 250 engaged during a gear change and the gear pair 210, a shock (impact) caused by the difference in rotation speed and inertia upstream of the dog clutch 250 (on engine 2 side) is generated. In a case where no plan is devised, such a shock (impact) may cause noise and vibration in a vehicle. Therefore, in the embodiment, in order to suppress the noise and the vibration caused by the shock (impact), the torque of the clutch 10 is controlled as described below.

2-2. Operation of Entire Transmission 1

Figure 3:
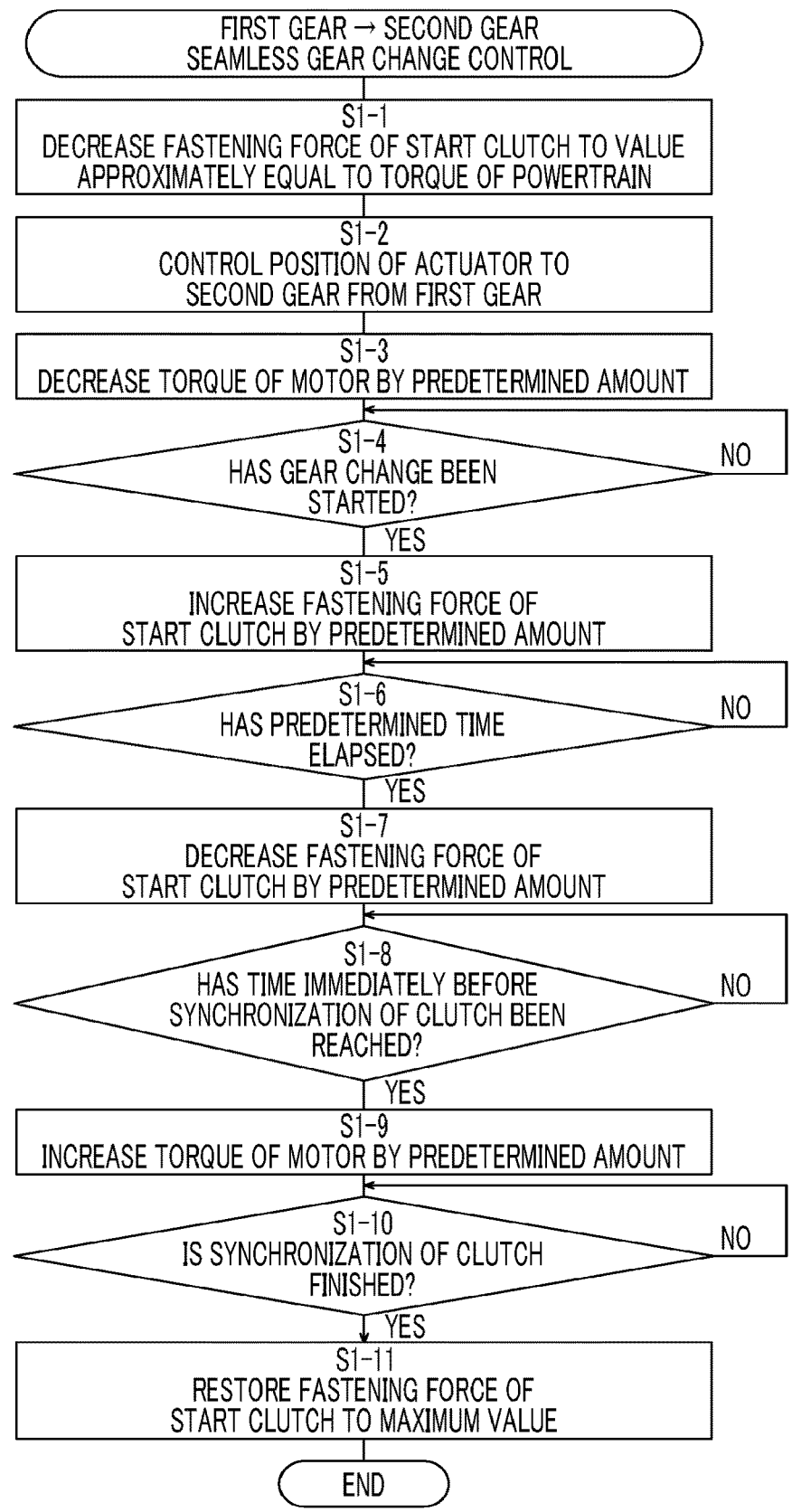
FIG. 3 is a flowchart for describing an example of a gear change in the transmission shown in FIG. 1 and an operation performed before and after the gear change.
Figure 4:
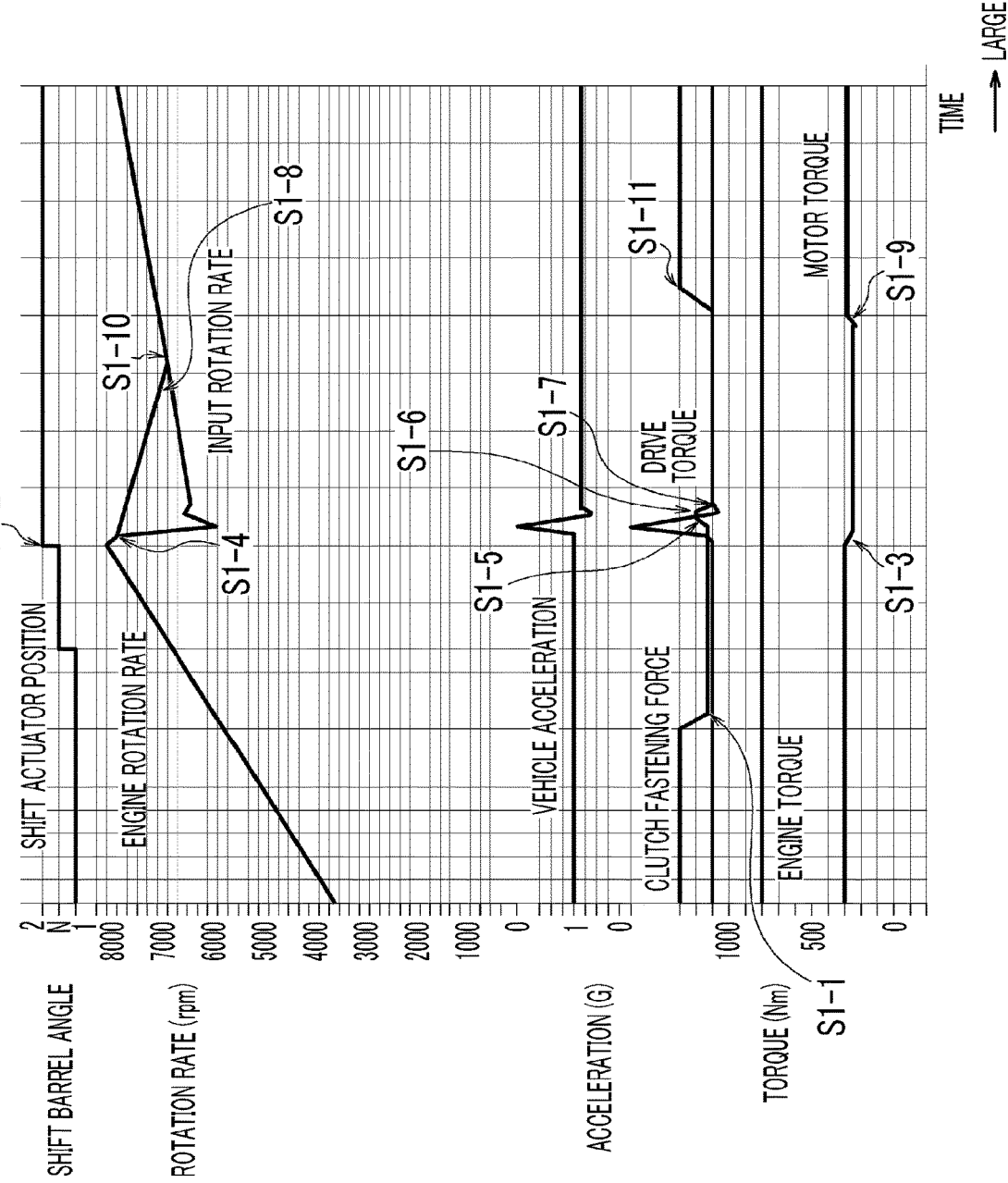
FIG. 4 is a graph schematically illustrating an example of a change in rotation rate of an engine and an input shaft of the transmission, acceleration of a vehicle, torque of the clutch, torque of the engine and a motor, and the like, which corresponds to FIG. 3.

Next, the operation of the entire transmission 1 in which the gear change control device 40 according to the present embodiment is installed will be described with reference to both of FIGS. 3 and 4 at the same time. FIG. 3 is a flowchart for describing an example of a gear change in the transmission 1 shown in FIG. 1 and an operation performed before and after the gear change. FIG. 4 is a graph schematically illustrating an example of a change in rotation rate of the engine 2 and the input shaft 200 of the transmission 1 (input rotation rate), acceleration of the vehicle, torque of the clutch 10, torque of the engine 2 and a motor, and the like, which corresponds to FIG. 3.

Hereinafter, description will be made by using upshifting from the first gear stage to the second gear stage as an example. However, the basic operation is the same for other gear changes (upshifting other than upshifting from first gear stage 1st to second gear stage 2nd and downshifting).

First, in step "S1-1", the gear change control device 40 (clutch controller 410 thereof) decreases the allowable transmission torque (fastening force) of the clutch 10 to a value approximately equal to the torque of a powertrain or a value greater than the torque of the powertrain by a predetermined amount (value approximately 5% to 10% greater than torque of powertrain, for example) in a state where the gear stage is the first gear stage 1st and an acceleration pedal (not shown) is stepped on by a driver (and rotation rate of engine 2 is increased in proportion to time). In a case where the allowable transmission torque of the clutch is made approximately equal to the torque of the powertrain, it is possible to reduce a shock at the time of a gear change. Meanwhile, in a case where the allowable transmission torque of the clutch is made greater than the torque of the powertrain by the predetermined amount, it is possible to prevent clutch slipping. In addition, here, the torque of the powertrain is the sum of the torque of the engine 2 and the torque of the motor (not shown), for example. However, in a case where the engine 2 is solely installed in the vehicle as a drive source, the torque of the powertrain corresponds to the torque of the engine 2. Note that, in this state, the rotation rate (number of times of rotation per unit time, that is, rotation speed) of the engine 2 and the rotation rate (number of times of rotation per unit time, that is, rotation speed) of the input shaft 200 of the transmission 1 coincide with each other.

Next, in step "S1-2", the gear change control device 40 (gear change controller 400 thereof) controls the actuator 32 as described above to control the position of the actuator 32 to a position corresponding to the second gear stage 2nd from a position corresponding to the first gear stage 1st via a position corresponding to neutral.

Next, in step "S1-3", the gear change control device 40 can decrease the torque of the motor (not shown) by a predetermined amount.

Thereafter, in step "S1-4", the gear change control device 40 (detection unit 420 thereof) determines whether the gear change mechanism 20 has started a gear change from the first gear stage 1st to the second gear stage 2nd or not. Specifically, the detection unit 420 can determine whether the gear change mechanism 20 has performed a gear change to the second gear stage 2nd or not based on whether the rotation rate of the engine 2 and the rotation rate of the input shaft 200 of the transmission 1 are different from each other or not, for example. The determination is based on a phenomenon that the rotation rate of the input shaft 200 of the transmission 1 is sharply decreased and the rotation rate of the engine 2 is also decreased after a gear change from the first gear stage 1st to the second gear stage 2nd is performed by the gear change mechanism 20 performing the operations described with reference to FIGS. 2A to 2F since a shock (impact) is generated on the clutch 10 as described above and slipping occurs.

In a case where the gear change control device 40 (detection unit 420 thereof) determines that the rotation rate of the engine 2 and the rotation rate of the input shaft 200 of the transmission 1 are the same as each other, step "S1-4" in the process is repeated. Meanwhile, in a case where the gear change control device 40 (detection unit 420 thereof) determines that the rotation rate of the engine 2 and the rotation rate of the input shaft 200 of the transmission 1 are different from each other, the process proceeds to next step "S1-5".

In step "S1-5", the gear change control device 40 (clutch controller 410 thereof) increases the allowable transmission torque (fastening force) of the clutch 10 by a predetermined amount such that the allowable transmission torque is increased to a "first reference value B1". Note that, details of the "first reference value B1" will be described later.

As shown in FIG. 4, after the rotation rate of the input shaft 200 of the transmission 1 is sharply decreased in comparison with the rotation rate of the engine 2, a phenomenon that the acceleration of the vehicle (and torque of powertrain) is sharply increased, that is, a phenomenon that the acceleration of the vehicle fluctuates occurs since the above-described shock (impact) is generated. With regard to this, in the embodiment, it is possible to intentionally decrease the allowable transmission torque (fastening force) of the clutch 10 by a predetermined value at a timing at which the acceleration of the vehicle is presumed to reach the maximum value (or timing close to timing at which acceleration of vehicle is presumed to reach maximum value).

Specifically, in the embodiment, in step "S1-6", the gear change control device 40 (detection unit 420 thereof) determines whether "first time t1" has elapsed after a time point at which the rotation rate of the engine 2 and the rotation rate of the input shaft 200 of the transmission 1 has become different from each other. In a case where the gear change control device 40 (detection unit 420 thereof) determines that "first time t1" has not elapsed after the time point at which the rotation rate of the engine 2 and the rotation rate of the input shaft 200 of the transmission 1 has become different from each other, step "S1-6" in the process is repeated.

Meanwhile, in a case where the gear change control device 40 (detection unit 420 thereof) determines that "first time t1" has elapsed after the time point at which the rotation rate of the engine 2 and the rotation rate of the input shaft 200 of the transmission 1 has become different from each other, the gear change control device 40 (clutch controller 410 thereof) decreases the allowable transmission torque (fastening force) of the clutch 10 by a predetermined amount such that the allowable transmission torque is decreased to a "second reference value B2" in step "S1-7". Note that, details of the "second reference value B2" will be described later. As described above, with the gear change control device 40 (clutch controller 410 thereof) intentionally decreasing the allowable transmission torque (fastening force) of the clutch 10 to the "second reference value B2" at a timing close to a timing at which the maximum value of the acceleration of the vehicle is reached, fluctuation in acceleration of the vehicle is suppressed as shown in FIG. 4. Note that, the reason that the fluctuation in acceleration of the vehicle is suppressed with the allowable transmission torque (fastening force) of the clutch 10 intentionally decreased to the "second reference value B2" will be described later.

Thereafter, as shown in FIG. 4, the rotation rate of the engine 2 decreases with time while the rotation rate of the input shaft 200 of the transmission 1 increases to be close to the rotation rate of the engine 2.

Next, in step "S1-8", the gear change control device 40 (detection unit 420 thereof) determines whether a time immediately before synchronization of the clutch 10 has been reached or not. For example, the gear change control device 40 (detection unit 420 thereof) can recognize that the time immediately before synchronization of the clutch 10 has been reached in a case where a difference between the rotation rate of the input shaft 200 of the transmission 1 and the rotation rate of the engine 2 reaches a first predetermined value or the like.

In a case where the gear change control device 40 (detection unit 420 thereof) determines that the time immediately before synchronization of the clutch 10 has not been reached, step "S1-8" in the process is repeated. Meanwhile, in a case where the gear change control device 40 (detection unit 420 thereof) determines that the time immediately before synchronization of the clutch 10 has been reached, the gear change control device 40 can increase the torque of the motor (not shown) by a predetermined amount (can restore torque of motor in step S1-1, for example) in step "S1-9".

Next, in step S1-10, the gear change control device 40 (detection unit 420 thereof) determines whether the synchronization of the clutch 10 is finished or not. For example, the gear change control device 40 (detection unit 420 thereof) can recognize that the synchronization of the clutch 10 is finished in a case where a difference between the rotation rate of the input shaft 200 of the transmission 1 and the rotation rate of the engine 2 reaches a second predetermined value (value smaller than first predetermined value) or the like.

In a case where the gear change control device 40 (detection unit 420 thereof) determines that the synchronization of the clutch 10 is not yet finished, step S1-10 in the process is repeated. Meanwhile, in a case where the gear change control device 40 (detection unit 420 thereof) determines that the synchronization of the clutch 10 is finished, the gear change control device 40 (clutch controller 410 thereof) can restore the allowable transmission torque of the clutch 10 to the maximum value in step S1-11 thereafter.

2-3. Torque Controlling Method for Clutch 10

It has been described that a phenomenon that a shock (impact) causes fluctuation in acceleration of the vehicle may occur in a case where the shock (impact) is generated in the transmission 1 due to a gear change from a certain gear stage to a gear stage one stage higher than the certain gear stage. Hereinafter, how the allowable transmission torque of the clutch 10 can be controlled in order to suppress the fluctuation in acceleration of the vehicle generated as described above will be described by using specific examples.

Figure 5:
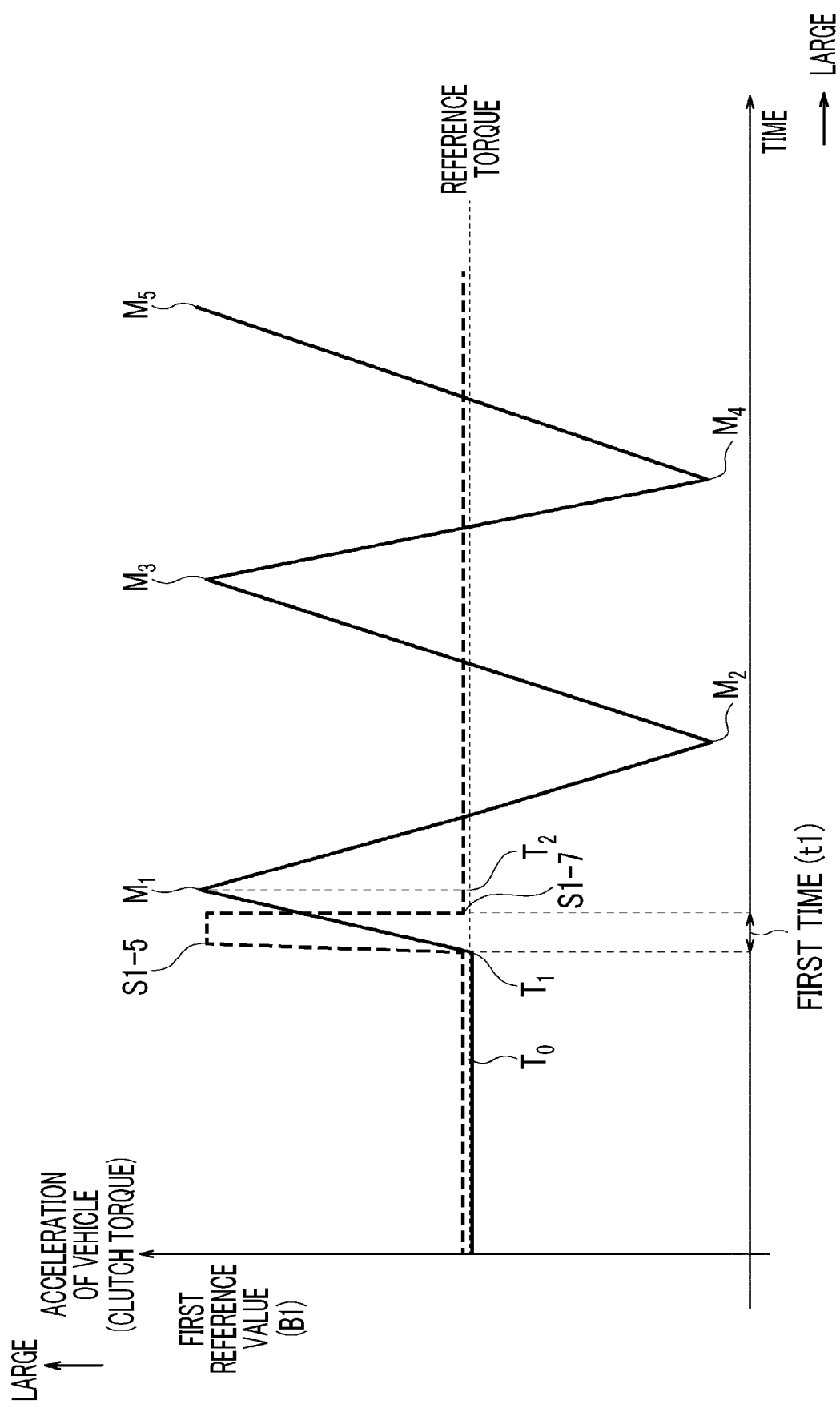
FIG. 5 is a diagram schematically illustrating an example of how the behavior of the acceleration of the vehicle is in a case where the allowable transmission torque of the clutch is controlled according to a first example in the transmission shown in FIG. 1.

FIG. 5 is a diagram schematically illustrating an example of how the behavior of the acceleration of the vehicle is in a case where the allowable transmission torque of the clutch 10 is controlled according to a first example in the transmission 1 shown in FIG. 1. In FIG. 5, a horizontal axis and a vertical axis represent time and the acceleration of the vehicle (or torque of clutch 10), respectively. In addition, in FIG. 5, a solid line represents the acceleration of the vehicle and a broken line represents the allowable transmission torque of the clutch 10.

First, as described above with reference to FIGS. 3 and 4, in step "S1-1", the allowable transmission torque (fastening force) of the clutch 10 is decreased to the value approximately equal to the torque of the powertrain (reference torque) or the value greater than the torque of the powertrain (reference torque) by the predetermined amount. Therefore, for example, at time T0, the allowable transmission torque of the clutch 10 is the value approximately equal to the torque of the reference torque or the value greater than the reference torque by the predetermined amount.

It will be assumed that the first shock (impact) is generated in the transmission 1 at time T1. Due to the shock, the gear change control device 40 (detection unit 420 thereof) determines that the rotation rate of the engine 2 and the rotation rate of the input shaft 200 of the transmission 1 are different from each other and determines that the gear change mechanism 20 has started a gear change from the first gear stage 1st to the second gear stage 2nd in step "S1-4". As a result, the gear change control device 40 (clutch controller 410 thereof) increases the allowable transmission torque (fastening force) of the clutch 10 to the "first reference value B1" in step "S1-5".

The "first reference value B1" can be set to a value close to a torque corresponding to a shock generated on the clutch 10 ("torque corresponding to shock") in the embodiment. The value of the torque corresponding to the shock may be different for each gear change but the torque corresponding to the shock can be calculated from an experimental value or the like based on two factors, which are (1) from which gear stage and to which gear stage the transmission 1 has started a gear change and (2) the rotation rate (rotation speed) of the engine 2 or the rotation rate (rotation speed) of the input shaft 200 of the transmission 1 immediately before the start of the gear change (that is, immediately before decrease in rotation rate). Therefore, the gear change control device 40 or the clutch controller 410 of the gear change control device 40 can store the torque corresponding to the shock (first reference value B1) in a "lookup table" in correlation with gear stages (from which gear stage and to which gear stage gear change is performed) and a rotation rate (rotation speed) in advance, for example (can include storage unit storing "lookup table"). Accordingly, the gear change control device 40 (clutch controller 410 thereof) can quickly specify the torque corresponding to the shock (first reference value B1) by searching the lookup table by using gear stages and a rotation rate immediately before a gear change as retrieval keys.

Next, after "first time t1" elapses from a time point when the rotation rate of the engine 2 and the rotation rate of the input shaft 200 of the transmission 1 become different from each other, the gear change control device 40 (clutch controller 410 thereof) decreases the torque (fastening force) of the clutch 10 in step "S1-7". It is "ideal" that a timing at which the torque of the clutch 10 is decreased as described is time T2 at which the acceleration of the vehicle reaches the first maximum value M1. When the torque of the clutch 10 is decreased at time T2, no power is transmitted to the drive wheels 3 and thus it is possible to decrease the acceleration of the vehicle most efficiently. Note that, FIG. 5 illustrates an example where a time point after elapse of "first time t1" from time T1 (time T1+"first time t1") and time T2 do not completely coincide with each other. "First time t1" can be calculated from an experimental value or the like based on two factors, which are (1) from which gear stage and to which gear stage the transmission 1 has started a gear change and (2) the rotation rate (rotation speed) of the engine 2 or the rotation rate (rotation speed) of the input shaft 200 of the transmission 1 immediately before the start of the gear change (that is, immediately before decrease in rotation rate), such that the time point after elapse of "first time t1" from time T1 becomes close to time T2. In addition, the gear change control device 40 or the clutch controller 410 of the gear change control device 40 can store "first time t1" in a "lookup table" in correlation with gear stages (from which gear stage and to which gear stage gear change is performed) and a rotation rate (rotation speed) in advance, for example (can include storage unit storing "lookup table"). Accordingly, the gear change control device 40 (clutch controller 410 thereof) can quickly specify "first time t1" by searching the lookup table by using gear stages and a rotation rate immediately before a gear change as retrieval keys.

FIG. 5 illustrates an example where the gear change control device 40 (clutch controller 410 thereof) decreases the torque (fastening force) of the clutch to the value approximately equal to the "reference torque" (torque of powertrain) or the value greater than the "reference torque" by the predetermined amount in step "S1-7". However, in this case, as shown in FIG. 5, there is a possibility that the acceleration of the vehicle reaches a minimum value M2, a maximum value M3, a minimum value M4, and a maximum value M5 sequentially, that is, a possibility that the acceleration of the vehicle fluctuates.

Figure 6:
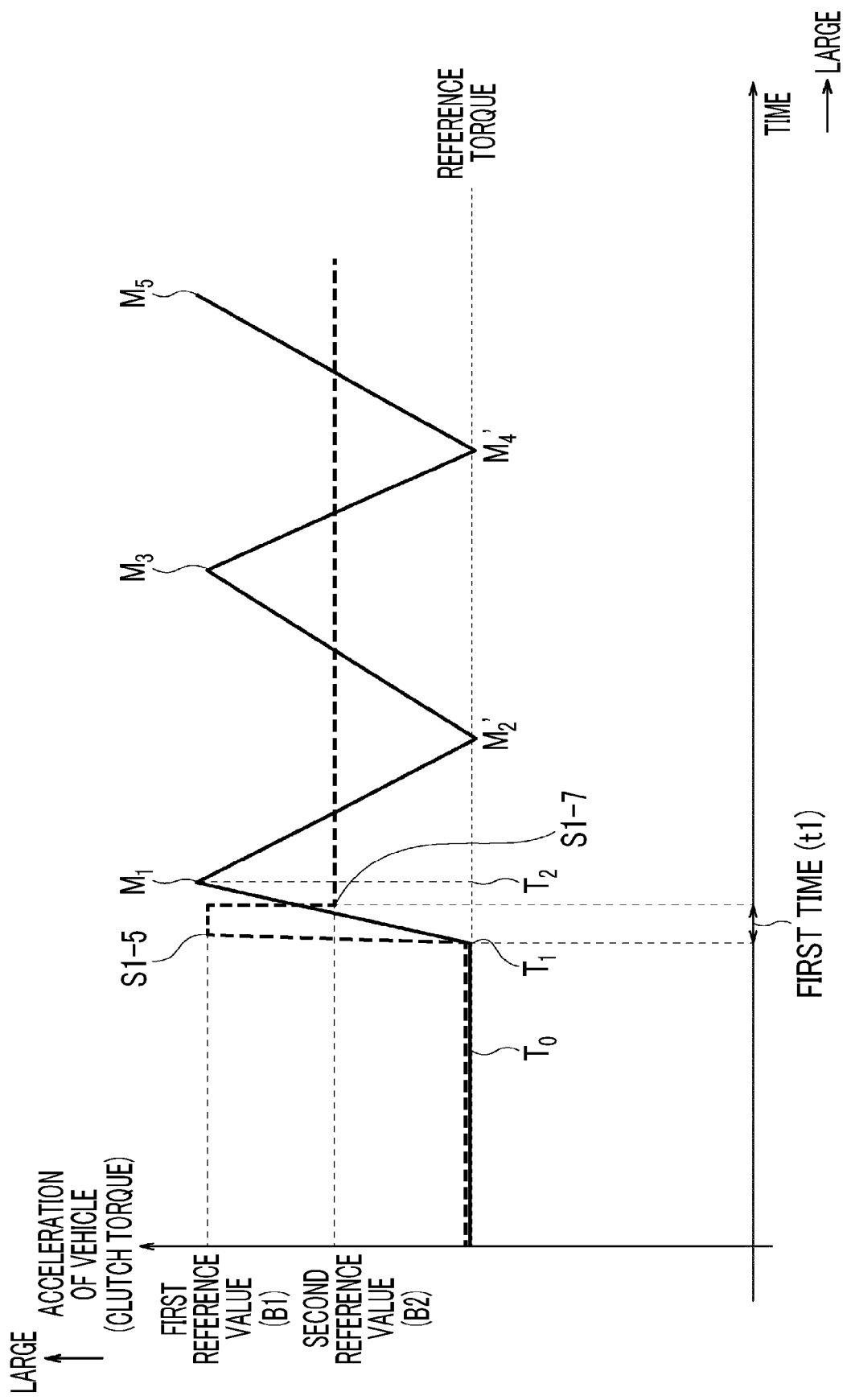
FIG. 6 is a diagram schematically illustrating an example of how the behavior of the acceleration of the vehicle is in a case where the allowable transmission torque of the clutch is controlled according to a second example in the transmission shown in FIG. 1.

FIG. 6 is a diagram schematically illustrating an example of how the behavior of the acceleration of the vehicle is in a case where the allowable transmission torque of the clutch 10 is controlled according to a second example in the transmission 1 shown in FIG. 1. In FIG. 6 as well, a horizontal axis and a vertical axis represent time and the acceleration of the vehicle (or torque of clutch 10), respectively, a solid line represents the acceleration of the vehicle, and a broken line represents the allowable transmission torque of the clutch 10. In the example shown in FIG. 6, at the time point after elapse of the "first time t1" from time T1, the gear change control device 40 (clutch controller 410 thereof) decreases the torque (fastening force) of the clutch 10 to the "second reference value B2" greater than the reference torque instead of the reference torque (torque of powertrain) in step "S1-7" in order to suppress fluctuation in acceleration of the vehicle as shown in FIG. 5. Accordingly, in the case of the example shown in FIG. 6, more power is transmitted to the drive wheels 3 in comparison with the example shown in FIG. 5 and thus a minimum value M2' and a minimum value M4' that the acceleration of the vehicle reaches are greater than the minimum value M2 and the minimum value M4, respectively. As a result, it is possible to suppress the width (amplitude) of fluctuation in acceleration of the vehicle.

It is obvious from an experiment performed by the present inventors that the width (amplitude) of fluctuation in acceleration of the vehicle is suppressed when the "second reference value B2" is set to approximately 10% to 50% of the "torque corresponding to the shock". Furthermore, it is obvious that the width (amplitude) of fluctuation in acceleration of the vehicle is suppressed when the "second reference value B2" is preferably set to approximately 50% of the "torque corresponding to the shock" as shown in FIG. 6. Furthermore, it is also obvious that the width (amplitude) of fluctuation in acceleration of the vehicle is suppressed when the "second reference value B2" is set to approximately 10% to 20% of the "torque corresponding to the shock".

As with the "first reference value B1", the "second reference value B2" can be calculated from an experimental value or the like based on two factors, which are (1) from which gear stage and to which gear stage the transmission 1 has started a gear change and (2) the rotation rate (rotation speed) of the engine 2 or the rotation rate (rotation speed) of the input shaft 200 of the transmission 1 immediately before the start of the gear change (that is, immediately before decrease in rotation rate). In addition, the gear change control device 40 or the clutch controller 410 of the gear change control device 40 can store the "second reference value B2" in a "lookup table" in correlation with gear stages (from which gear stage and to which gear stage gear change is performed) and a rotation rate (rotation speed) in advance, for example (can include storage unit storing "lookup table"). Accordingly, the gear change control device 40 (clutch controller 410 thereof) can quickly specify the "second reference value B2" by searching the lookup table by using gear stages and a rotation rate immediately before a gear change as retrieval keys.

Note that, in the example shown in FIG. 6 as well, it is "ideal" that a timing (time T1+"first time t1") at which the gear change control device 40 (clutch controller 410 thereof) decreases the torque of the clutch 10 to the "second reference value B2" in step "S1-7" is a timing (time T2) at which the acceleration of the vehicle reaches the maximum value M1. However, FIG. 6 illustrates an example where the timings do not completely coincide with each other.

FIG. 7 is a diagram schematically illustrating an example of how the behavior of the acceleration of the vehicle is in a case where the allowable transmission torque of the clutch 10 is controlled according to a third example in the transmission 1 shown in FIG. 1. In FIG. 7 as well, a horizontal axis and a vertical axis represent time and the acceleration of the vehicle (or torque of clutch 10), respectively, a solid line represents the acceleration of the vehicle, and a broken line represents the allowable transmission torque of the clutch 10. FIG. 7 illustrates an example where step "S2", in which the gear change control device 40 (clutch controller 410 thereof) decreases the torque of the clutch 10 to the value approximately equal to the "reference torque" (torque of powertrain) or the value greater than the "reference torque" by the predetermined amount (value approximately 5% to 10% greater than "reference torque", for example) when "second time t2" elapses from a time point at which the gear change control device 40 (clutch controller 410 thereof) decreases the torque of the clutch 10 to the "second reference value B2" in step S1-7, is added to the example shown in FIG. 6.

In the example shown in FIG. 7, at a time point at which the acceleration of the vehicle reaches the minimum value M2', the gear change control device 40 (clutch controller 410 thereof) decreases the torque of the clutch 10 to the reference torque from the "second reference value B2" and thus power transmitted to the drive wheels 3 is decreased. Therefore, the acceleration of the vehicle can be maintained at the minimum value M2' without rising from the minimum value M2' thereafter (unlike example shown in FIG. 6).

It is "ideal" that "second time t2" is set such that a timing after elapse of "second time t2" completely coincides with a timing at which the acceleration of the vehicle reaches the minimum value M2'. However, actually, even when both of the timings do not completely coincide with each other, fluctuation (amplitude) in acceleration of the vehicle can be suppressed. "Second time t2" can be calculated from an experimental value or the like based on two factors, which are (1) from which gear stage and to which gear stage the transmission 1 has started a gear change and (2) the rotation rate (rotation speed) of the engine 2 or the rotation rate (rotation speed) of the input shaft 200 of the transmission 1 immediately before the start of the gear change (that is, immediately before decrease in rotation rate). In addition, the gear change control device 40 or the clutch controller 410 of the gear change control device 40 can store "second time t2" in a "lookup table" in correlation with gear stages (from which gear stage and to which gear stage gear change is performed) and a rotation rate (rotation speed) in advance, for example (can include storage unit storing "lookup table"). Accordingly, the gear change control device 40 (clutch controller 410 thereof) can quickly specify "second time t2" by searching the lookup table by using gear stages and a rotation rate immediately before a gear change as retrieval keys.

Note that, step "S2" shown in FIG. 7 can be performed between step "S1-7" and step "S1-8" shown in FIG. 3.

3. Modification Example

In the embodiment described with reference to FIG. 3, a case where the allowable transmission torque of the clutch 10 is increased by the predetermined amount and is set to the "first reference value B1" in step "S1-5" after a gear change is started in step "S1-4" has been described. Alternatively, in another embodiment, before a gear change is started in step "S1-4", the allowable transmission torque of the clutch 10 may be set to the "first reference value B1" at a time point at which a shift barrel angle shown in FIG. 4 is an angle corresponding to the first gear stage 1st (accordingly, allowable transmission torque of clutch 10 is maintained at "first reference value B1" even at time T0 in FIGS. 6 and 7) and step "S1-6" and subsequent steps may be performed in this state after the gear change is started in step "S1-4", with step "S1-5" being omitted. In this case, even though the first impact generated on the vehicle is great in comparison with the embodiment shown in FIG. 3, a phenomenon that the acceleration of the vehicle fluctuates after the impact, that is, a phenomenon that vibration and noise in the vehicle are generated after the impact can be suppressed. Note that, this method can be applied to the above examples described with reference to FIGS. 6 and 7.

In addition, in the embodiment described with reference to FIGS. 3 and 4, the powertrain includes the engine 2 and the motor. However, in a case where a configuration in which the powertrain includes the engine 2 solely (does not include motor) is adopted, step "S1-3" and step "S1-9" in FIGS. 3 and 4 can be removed.

Furthermore, in the embodiment described with reference to FIG. 7, a case where the torque of the clutch 10 is decreased two times after the start of a gear change has been described. In another embodiment, in a case where fluctuation in acceleration of the vehicle (vibration) is presumed to remain even when the torque of the clutch 10 is decreased two times, the torque of the clutch 10 may be decreased one or more times again (that is, three or more times in total) in accordance with the timing of the remaining vibration (timing of maximum value or minimum value).

Furthermore, in the above-described embodiment, a case where the transmission 1 is a seamless type gear change mechanism has been described as a most preferable embodiment. However, the technical ideas described in the present application can also be applied to any transmission in which the rotation rate of an input shaft is decreased due to a gear change from a certain gear stage to a gear stage one stage higher than the certain gear stage.

Note that, the above-described various embodiments can be used while being combined with each other unless there is no contradiction. In addition, in the present application, the meaning of the term "rotation rate" used in relation to the engine 2 or the input shaft 200 of the transmission 1 includes (1) a rotation rate and (2) the number of times of rotation per unit time (that is, rotation speed).

In addition, in the above-described embodiment, for example, a case where the rotation rate of an input shaft of a transmission is decreased due to a shock caused by a gear change from a certain gear stage to another gear stage "one stage higher" than the certain gear stage that is performed by the transmission has been focused on. However, the technical ideas disclosed in the present application can also be applied to a case where the rotation rate of an input shaft of a transmission is decreased due to a shock caused by a gear change from a certain gear stage to another gear stage "a plurality of stages higher" than the certain gear stage that is performed by the transmission (for example, transmission that can use jump-over gear change).

As described above, according to the various embodiments, in a case where the rotation rate of an input shaft of a transmission is decreased due to a shock caused by a gear change from a certain gear stage to another gear stage one or a plurality of stages higher than the certain gear stage that is performed by the transmission, an operation of suppressing an increase in acceleration (applying acceleration of opposite phase) by decreasing the torque (fastening force) of a clutch such that drive power transmitted to a drive wheel is decreased is performed at a timing close to the timing of the increase in acceleration, with respect to an increase in acceleration presumed to occur. Accordingly, it is possible to suppress fluctuation in acceleration (amplitude and noise) of a vehicle. Therefore, a driver merely feels the first impact (driver can even enjoy impact that is generated once for each gear change) and thus the quality of the transmission can be improved.

4. Various Embodiments

A gear change control device according to a first aspect includes a detection unit configured to detect the gear stage of a transmission and measure the input rotation rate of the transmission and the rotation rate of an engine and a controller configured to decrease the torque of a clutch to a second reference value from a first reference value when a first time elapses from a time point at which the rotation rate of the engine and the input rotation rate of the transmission become different from each other due to a gear change from a certain gear stage to a gear stage one or a plurality of stages higher than the certain gear stage that is performed by the transmission.

According to the aspect, in a case where the rotation rate of an input shaft of the transmission is decreased due to a shock caused by a gear change from a certain gear stage to another gear stage one or a plurality of stages higher than the certain gear stage that is performed by the transmission, an operation of suppressing an increase in acceleration (applying acceleration of opposite phase) by decreasing the torque (fastening force) of the clutch such that drive power transmitted to a drive wheel is decreased is performed at a timing close to the timing of the increase in acceleration, with respect to an increase in acceleration presumed to occur. Accordingly, it is possible to suppress fluctuation in acceleration (amplitude and noise) of a vehicle. Therefore, a driver merely feels the first impact and thus the quality of the transmission can be improved.

A second aspect provides the gear change control device according to the first aspect, in which the controller decreases the torque of the clutch to a value equal to the torque of a powertrain including the engine or a value greater than the torque of the powertrain by a predetermined amount when a second time elapses from a time point at which the torque of the clutch is decreased to the second reference value from the first reference value.

According to the aspect, with respect to fluctuation in acceleration of a vehicle that is not completely eliminated with the torque of the clutch decreased one time (to second reference value from first reference value), an operation of suppressing an increase in acceleration (applying acceleration of opposite phase) by decreasing the torque of the clutch (to value approximately equal to torque of powertrain including or value greater than torque of powertrain by predetermined amount from second reference value) again such that drive power transmitted to the drive wheel is decreased is performed at a timing close to the timing of an increase in fluctuation level. Accordingly, it is possible to more reliably suppress fluctuation in acceleration (amplitude and noise) of a vehicle.

A third aspect provides the gear change control device according to the first aspect or the second aspect, in which the controller increases the torque of the clutch to the first reference value greater than the second reference value when the rotation rate of the engine and the input rotation rate of the transmission become different from each other due to the gear change after the torque of the clutch is decreased to the torque of the powertrain including the engine before the gear change performed by the transmission.

According to the aspect, it is possible to suppress the magnitude of the first shock (impact) generated in the transmission due to a gear change by increasing the torque of the clutch to the first reference value after the start of the gear change instead of before the start of the gear change.

A fourth aspect provides the gear change control device according to the first aspect or the second aspect, in which the controller increases the torque of the clutch to the first reference value greater than the second reference value before the gear change performed by the transmission.

According to the aspect, even in a case where the torque of the clutch is increased to the first reference value before the start of the gear change instead of after the start of the gear change, fluctuation in acceleration of the vehicle (vibration and noise) after the first shock (impact) generated in the transmission due to the gear change can be suppressed although the shock is somewhat great. Therefore, the quality of the transmission can be improved.

A fifth aspect provides the gear change control device according to any of the first aspect to the fourth aspect, in which the first reference value is specified from the certain gear stage and the input rotation rate of the transmission immediately before the gear change.

According to the aspect, regardless of to which gear stage a gear change is performed, the first reference value (for example, torque corresponding to first shock generated on clutch) can be quickly specified from the gear stage and the rotation rate (rotation speed) of the input shaft of the transmission and thus it is possible to suppress fluctuation in acceleration of the vehicle by controlling the torque of the clutch quickly.

A sixth aspect provides the gear change control device according to any of the first aspect to the fifth aspect, in which the second reference value falls in a range from 10% to 50% of the first reference value.

According to the aspect, since a value within a range from 10% to 50% of the first reference value is used as the second reference value, fluctuation in acceleration of the vehicle can be suppressed.

A seventh aspect provides the gear change control device according to any of the first aspect to the sixth aspect, in which the second reference value falls in a range from 10% to 20% of the first reference value.

According to the aspect, since a value within a range from 10% to 20% of the first reference value is used as the second reference value, fluctuation in acceleration of the vehicle can be suppressed.

An eighth aspect provides the gear change control device according to any of the first aspect to the sixth aspect, in which the second reference value is 50% of the first reference value.

According to the aspect, since a value that is 50% of the first reference value is used as the second reference value, fluctuation in acceleration of the vehicle can be suppressed.

A ninth aspect provides the gear change control device according to any of the first aspect to the eighth aspect, in which the controller restores the torque of the clutch to the maximum value when the rotation rate of the engine and the input rotation rate of the transmission become the same as each other after the gear change performed by the transmission.

According to the aspect, it is possible to suppress fluctuation in acceleration of the vehicle caused by a gear change by intentionally decreasing the torque of the clutch to the second reference value from the first reference value after the start of the gear change at a timing before synchronization of the clutch is finished with the gear change finished instead of decreasing the torque of the clutch to the second reference value from the first reference value before the start of the gear change.

A tenth aspect provides the gear change control device according to any of the first aspect to the ninth aspect, in which the input rotation rate of the transmission is decreased due to the gear change.

According to the aspect, in the case of a transmission of which the input rotation rate is decreased due to a gear change, fluctuation in acceleration of a vehicle due to a shock caused by the decrease in input rotation rate can be suppressed.

An eleventh aspect provides the gear change control device according to the tenth aspect, in which the transmission is a seamless type transmission.

According to the aspect, in the case of a seamless type transmission of which the input rotation rate is decreased due to a gear change, fluctuation in acceleration of a vehicle due to a shock caused by the decrease in input rotation rate can be suppressed.

As described above, according to the aspects, it is possible to provide a gear change control device that improves the quality of a transmission.

What is claimed is:

1. A gear change control device comprising:
a detection sensor configured to detect a gear stage of a transmission and measure an input rotation rate of the transmission and a rotation rate of an engine; and
a controller configured to decrease a torque of a clutch to a second reference value from a first reference value when a first time elapses from a time point at which the rotation rate of the engine and the input rotation rate of the transmission become different from each other due to a gear change from a certain gear stage to a gear stage one or a plurality of stages higher than the certain gear stage that is performed by the transmission,
wherein the controller decreases the torque of the clutch to a value equal to a torque of a powertrain including the engine or a value greater than the torque of the powertrain by a predetermined amount when a second time elapses from a time point at which the torque of the clutch is decreased to the second reference value from the first reference value.

2. The gear change control device according to claim 1, wherein the controller increases the torque of the clutch to the first reference value greater than the second reference value when the rotation rate of the engine and the input rotation rate of the transmission become different from each other due to the gear change after the torque of the clutch is decreased to the torque of the powertrain including the engine before the gear change performed by the transmission.

3. The gear change control device according to claim 1, wherein the controller increases the torque of the clutch to the first reference value greater than the second reference value before the gear change performed by the transmission.

4. The gear change control device according to claim 1, wherein the first reference value is specified from the certain gear stage and the input rotation rate of the transmission immediately before the gear change.

5. A gear change control device comprising:
a detection sensor configured to detect a gear stage of a transmission and measure an input rotation rate of the transmission and a rotation rate of an engine; and
a controller configured to decrease a torque of a clutch to a second reference value from a first reference value when a first time elapses from a time point at which the rotation rate of the engine and the input rotation rate of the transmission become different from each other due to a gear change from a certain gear stage to a gear stage one or a plurality of stages higher than the certain gear stage that is performed by the transmission,
wherein the controller increases the torque of the clutch to the first reference value greater than the second reference value when the rotation rate of the engine and the input rotation rate of the transmission become different from each other due to the gear change after the torque of the clutch is decreased to the torque of the powertrain including the engine before the gear change performed by the transmission.

6. The gear change control device according to claim 5, wherein the first reference value is specified from the certain gear stage and the input rotation rate of the transmission immediately before the gear change.

* * * * *